United States Patent
Sai

[19]

[11] Patent Number: 5,825,804
[45] Date of Patent: Oct. 20, 1998

[54] TEMPERATURE DISTRIBUTION MEASURING APPARATUS USING AN OPTICAL FIBER

[75] Inventor: Yukio Sai, Tokorozawa, Japan

[73] Assignee: Kabushiki Kaisha Toshiba, Kawasaki, Japan

[21] Appl. No.: 813,980

[22] Filed: Mar. 10, 1997

Related U.S. Application Data

[62] Division of Ser. No. 528,594, Sep. 15, 1995, Pat. No. 5,639,162, which is a continuation of Ser. No. 177,324, Jan. 4, 1994, abandoned.

[30] Foreign Application Priority Data

Jan. 6, 1993 [JP] Japan ................................. 5-000643
Jan. 6, 1993 [JP] Japan ................................. 5-000646

[51] Int. Cl.⁶ ............................ G01K 11/32; G01K 3/06
[52] U.S. Cl. ................... 374/137; 374/161; 250/227.18; 250/227.23; 356/44; 356/301; 364/557
[58] Field of Search .................... 374/161, 137, 374/131, 120; 250/227.18, 227.23, 227.14, 227.11; 356/44, 301; 364/557

[56] References Cited

U.S. PATENT DOCUMENTS

| | | | |
|---|---|---|---|
| 4,767,219 | 8/1988 | Bibby | 374/161 |
| 4,804,264 | 2/1989 | Kirchhoffer et al. | 356/301 |
| 4,823,166 | 4/1989 | Hartog et al. | 356/44 |
| 4,950,886 | 8/1990 | Claus et al. | 250/227.14 |
| 5,028,146 | 7/1991 | Wada | 374/161 |
| 5,054,935 | 10/1991 | Tanabe et al. | 374/161 |
| 5,113,277 | 5/1992 | Ozawa et al. | 359/127 |
| 5,191,206 | 3/1993 | Boiarski et al. | 374/161 |
| 5,198,662 | 3/1993 | Yamaguchi et al. | 374/137 |
| 5,217,306 | 6/1993 | Wada | 356/44 |
| 5,272,334 | 12/1993 | Sai | 356/44 |
| 5,292,196 | 3/1994 | Iida et al. | 374/161 |
| 5,356,220 | 10/1994 | Iida et al. | 374/161 |
| 5,618,108 | 4/1997 | Sai et al. | 374/161 |

FOREIGN PATENT DOCUMENTS

| | | | |
|---|---|---|---|
| 0061622 | 3/1989 | Japan | 374/161 |
| 2140554 | 11/1984 | United Kingdom | 374/137 |

OTHER PUBLICATIONS

"Temperature Distribution Measurement Using Raman Ratio Thermometry", J.P. Dakin et al., SPIE, Fiber Optic and Laser Sensors III, 566:249–256 (1985).

*Primary Examiner*—Diego F.F. Gutierrez
*Attorney, Agent, or Firm*—Finnegan, Henderson, Farabow, Garrett & Dunner, L.L.P.

[57] ABSTRACT

A temperature distribution measuring apparatus and related method uses optical time domain reflectometry to determine temperature distribution along an optical fiber. A light pulse enters the fiber at one end, and backscattered light at each of various points in the optical fiber has a Raman spectrum which contains temperature information. An impulse response to the Raman spectra of backscattered light is produced using a transformation to provide a temperature distribution along the optical fiber. An impulse response on the anti-Stokes component and an impulse response of the Stokes component of the Raman spectrum are each produced, and the ratio between them indicates temperature distribution. Each impulse response is obtained by performing deconvolution on the Stokes component and the anti-Stokes component using an inverse matrix of measured incident light, the inverse matrix being obtained by an iteration method with an optimum number of iterations.

4 Claims, 7 Drawing Sheets

FIG. 2A (ANTI-STOKES)

$\dfrac{\cdot}{\cdot}$ = TEMPERATURE DISTRIBUTION

FIG. 2B (STOKES)

INCIDENT LIGHT

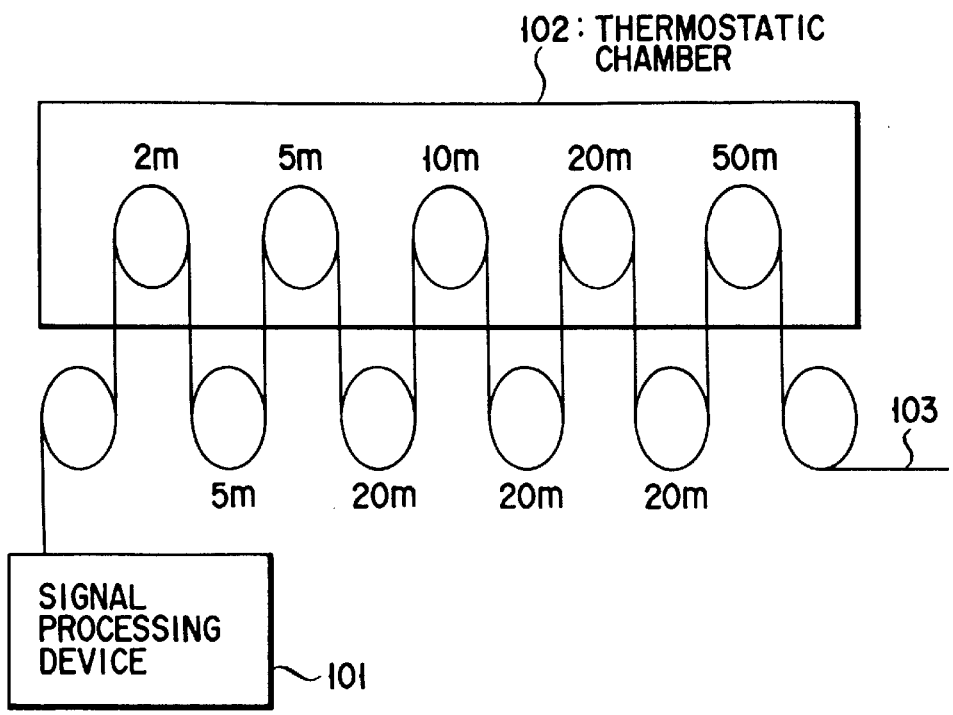
F I G. 3
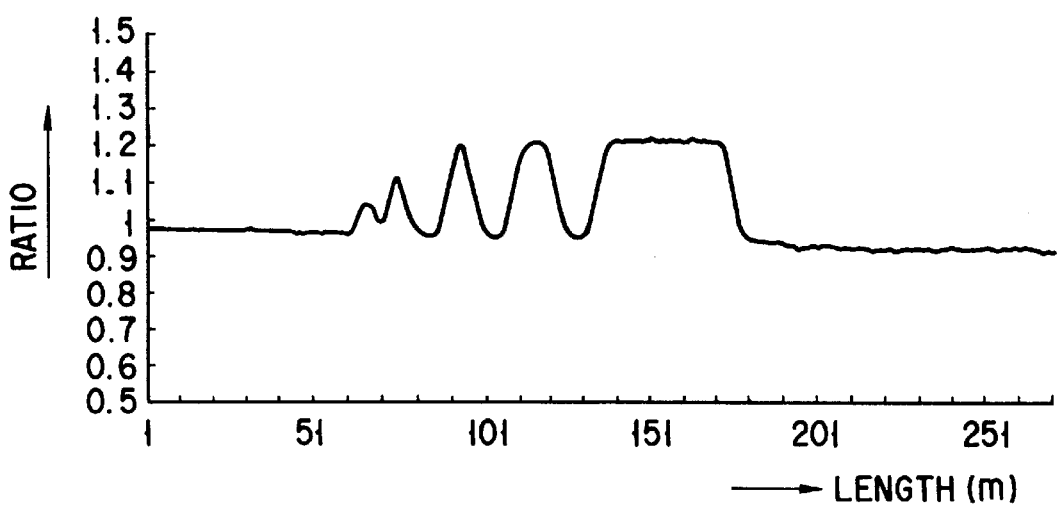
F I G. 4

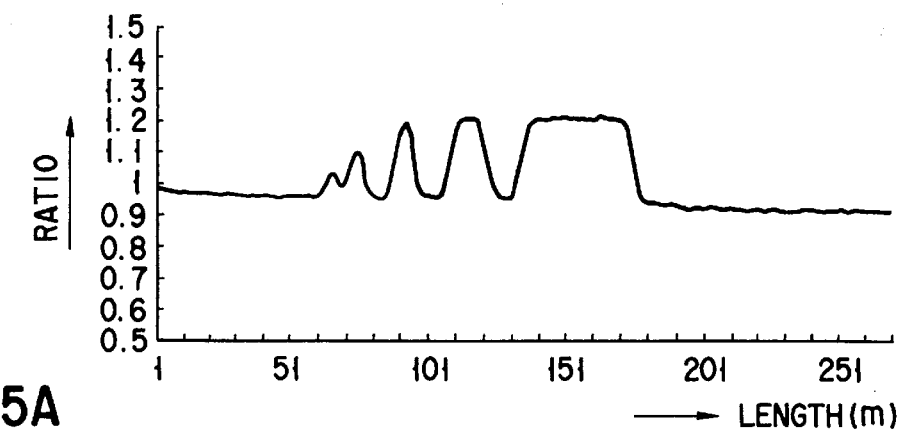
F I G. 5A
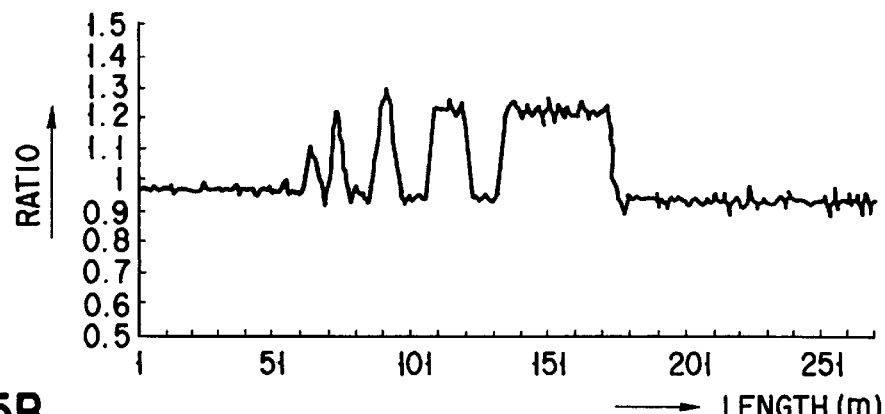
F I G. 5B
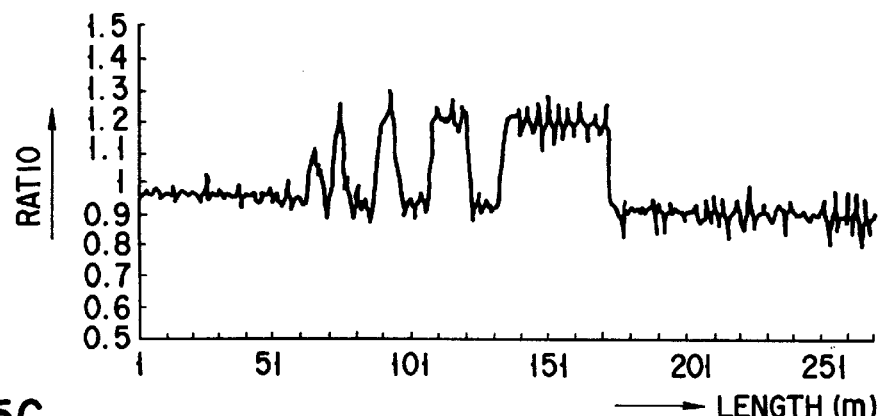
F I G. 5C

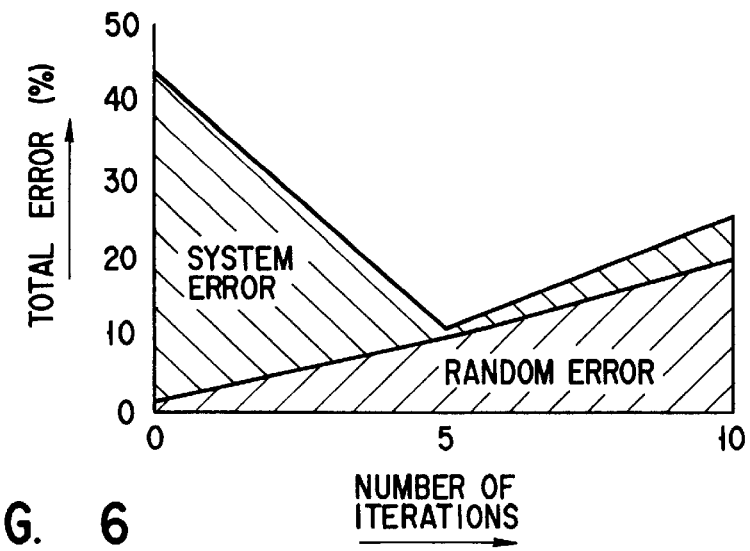
F I G. 6
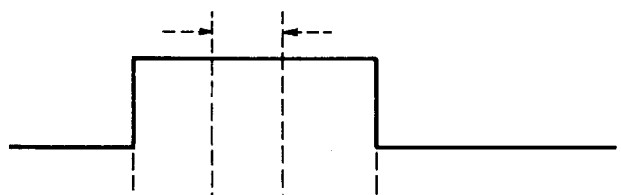
F I G. 7A
F I G. 7B
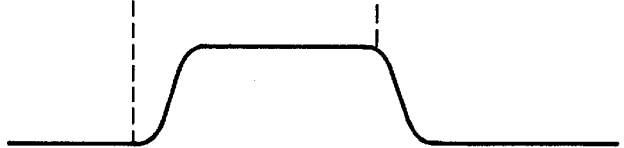
F I G. 7C
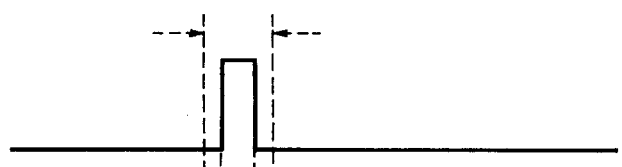
F I G. 8A
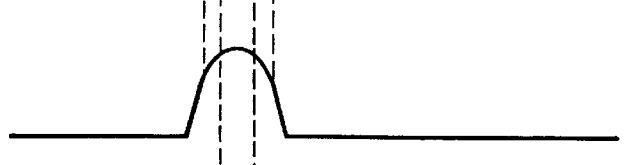
F I G. 8B
F I G. 8C

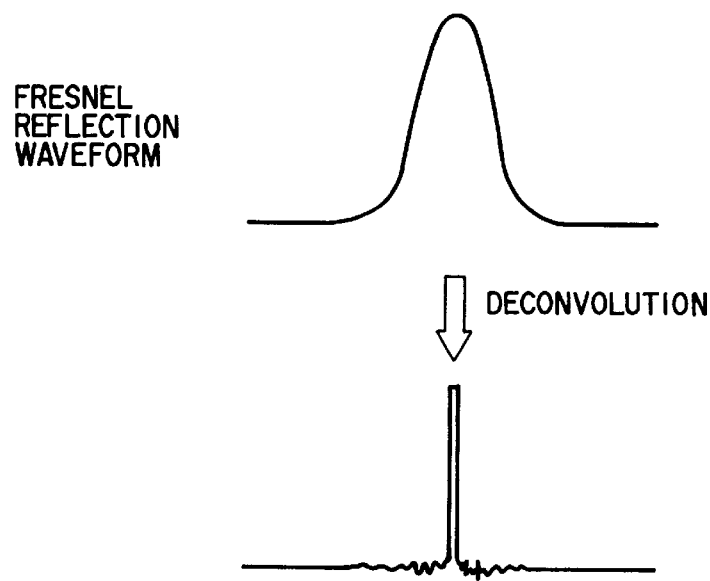
F I G. 10
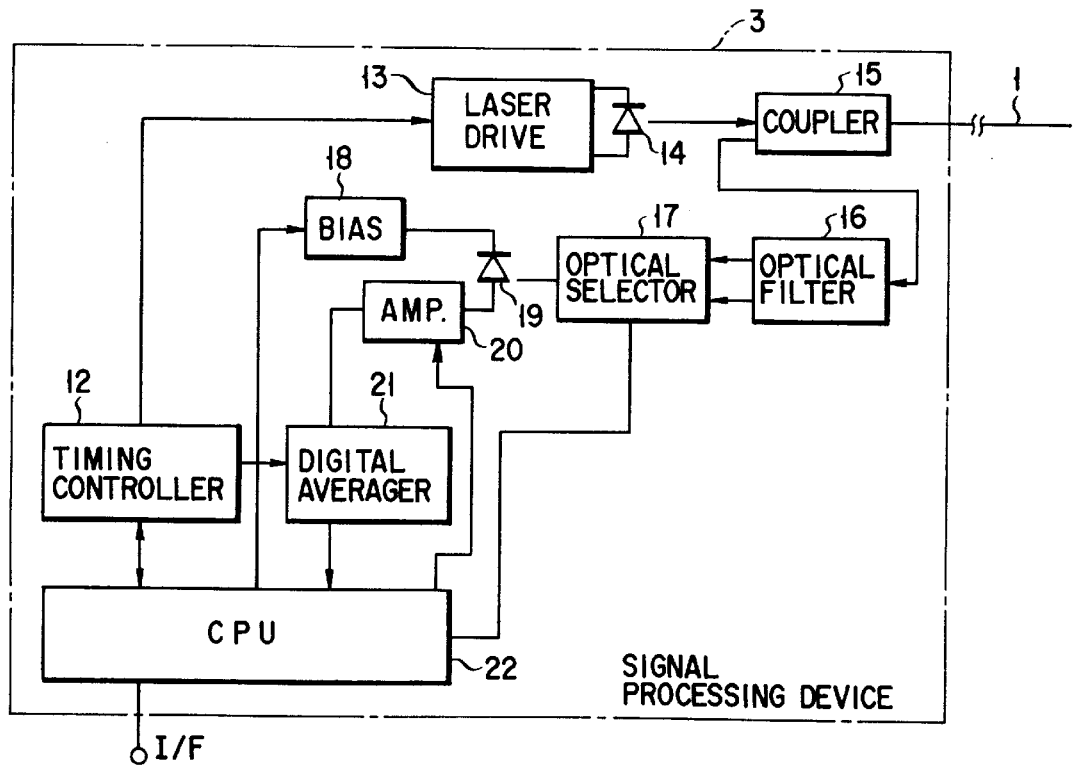
F I G. 11

TEMPERATURE DISTRIBUTION MEASURING APPARATUS USING AN OPTICAL FIBER

This is a division of application Ser. No. 08/528,594, filed Sep. 15, 1995, now U.S. Pat. No. 5,639,162, issued Dec. 12, 1996, which is a continuation of Ser. No. 08/177,324, filed Jan. 4, 1994, now abandoned.

BACKGROUND OF THE INVENTION

1. Field of the Invention

The present invention relates to a temperature distribution measuring apparatus which projects pulsed-light into an optical fiber, measures the Raman spectrum of backscattered light occurring in the optical fiber, and determines a temperature distribution along the optical fiber.

2. Description of the Related Art

In the field of optical sensing technology, a temperature distribution measuring apparatus using optical time domain reflectometry (OTDR) techniques is known which allows pulsed-light to enter an optical fiber at one end, samples and measures the Raman spectrum of backscattered light at various points in the optical fiber, and determines from the sampling data a temperature distribution along the optical fiber.

FIG. 1 is a schematic diagram illustrating the measuring principle of a conventional temperature distribution measuring apparatus of this type. A laser pulse enters an optical fiber 100 to excite backscattered light in the optical fiber 100. The spectrum intensity, and polarization state of the backscattered light contain temperature information at the point where the backscattered light has occurred. The backscattered light that propagates toward the laser-pulse incident side is sensed and processed as a time-sequence signal. A one-dimensional temperature distribution along the optical fiber is thus measured.

The backscattered light occurring when a laser pulse enters the optical fiber 100 includes the Rayleigh spectrum due to fluctuations in density, the Brillouin spectrum due to propagative fluctuations, and the Raman spectrum due to rotation and vibration of molecules. The Brillouin spectrum and the Raman spectrum are inelastic scattered light and have a different spectrum from that of the excited light. The temperature information is contained in all three types of scattered light. The most temperature-sensitive spectrum is the Raman spectrum, whose intensity varies with temperature.

When the temperature is measured using the Raman spectrum, the Stokes component of the Raman spectrum of the backscattered light whose wavelength becomes longer than that of the incident light and the anti-Stokes component of the Raman spectrum of the backscattered light whose wavelength becomes shorter than that of the incident light are extracted by an optical filter, and the temperature distribution is calculated based on the ratio between the two components of backscattered light. Of course, the measurement can be performed on the basis of only one component of the Raman spectrum of the backscattered light. In both cases, however, at least one component of the Raman spectrum of the backscattered light must be extracted by an optical filter.

In such a temperature distribution measuring apparatus, not only the accuracy of temperature, a physical quantity to be measured but also its positional resolution is important. The positional resolution is generally determined by the incident pulse width. It further depends on the sampling frequency when the processing system of the backscattered light is a sampled-value system.

If the sampling period is sufficiently shorter than half the width of the incident light pulses, the measured backscattered light is the total of the backscattered light for half the width of the incident light pulses. Therefore, the measured temperature is the average temperature over half the pulse width. Even if the sampling frequency becomes fast, the positional resolution cannot be increased more than the width of the incident pulse.

Therefore, to increase the positional resolution, narrowing the pulse width of the incident light is effective. To achieve this, two methods can be considered: one is to actually narrow the width of the incident pulsed-light itself, and the other is to consider a response of the backscattered light to a light pulse of a finite width to be a transformation, and to obtain an impulse response by performing an inverse transformation of the measured value of the backscattered light.

Since narrowing the pulse width alone cannot make the width of a light pulse narrower than the pulse width determined by the rising and falling characteristics of a source of pulsed-light, it is difficult to make the width of the incident pulse narrower than that achieved by the elements already developed. Thus, this method is unsuitable for increasing the positional resolution.

In contrast, a method of obtaining an impulse response is considered effective in increasing the positional resolution.

Therefore, the method of obtaining an impulse response will be examined.

Since the transformation used in the method of obtaining an impulse response is a convolution in a range of linear approximation, if the impulse response is expressed as h(t) and the incident pulsed-light is expressed as P(t), the backscattered light signal g(t) will be obtained by performing convolution of the impulse response h(t) with respect to the incident light pulse P(t). It can be expressed as:

$$g(t) = \int_{\tau=0}^{t} h(t)P(t-\tau)d\tau \tag{1}$$

Then, the impulse response h(t) can be obtained by measuring the incident light pulse P(t), an input signal, and performing deconvolution of the measured backscattered light signal g(t) with respect to the incident light pulse P(t).

Actually, however, even if deconvolution is performed on the measured data, it is difficult to obtain the correct impulse response because the measured signal contains noise components. The reason for this will be described below.

By achieving the Fourier transform of Equation (1) and adding noise component $N(\omega)$ to the backscattered light, the following equation will be obtained:

$$G(\omega) + N(\omega) = H(\omega)P(\omega) \tag{2}$$

For inverse transformation, by dividing both sides of Equation (2) by $P(\omega)$, the following equation is obtained:

$$H(\omega) = G(\omega)/P(\omega) + N(\omega)/P(\omega) \tag{3}$$

Here, the second term on the right side of Equation (3) is a problem. While the spectrum of incident light pulse component $P(\omega)$ is finite, the spectrum of noise component $N(\omega)$ extends over a very wide range, thus, the division result diverges in the high-frequency range (where the angular velocity $\omega$ is large).

This divergence makes it impossible to obtain the impulse response correctly, so that the positional resolution cannot be improved as expected, thus reducing the total accuracy of position measurement.

SUMMARY OF THE INVENTION

Accordingly, it is an object of the present invention to provide a temperature distribution measuring apparatus which projects pulsed-light into an optical fiber and measures the Raman spectrum of backscattered light occurring in the optical fiber to obtain a temperature distribution along the optical fiber and particularly which can obtain an impulse response of an incident light accurately from the measured value of the backscattered light and improve a positional resolution of the temperature distribution.

According to the present invention, there is provided an apparatus for measuring a temperature distribution along an optical fiber, comprising light source means for projecting pulsed-light into the optical fiber; optical filter means for receiving Raman spectrum of backscattered light occurred in the optical fiber and extracting the anti-Stokes component and Stokes component of the Raman spectrum of the backscattered light; means for obtaining an impulse response of the anti-Stokes component and an impulse response of the Stokes component by performing deconvolution on the Stokes component and the anti-Stokes component using an inverse matrix of incident pulsed-light, the inverse matrix obtained by an iteration method with an optimum number of iterations; means for obtaining a temperature distribution according to a ratio between the impulse responses of the anti-Stokes component and the Stokes component; and means for causing the temperature distribution obtaining means to obtain the temperature distribution in a portion as long as or shorter than a half-width of the pulsed-light where the temperature is known, determining the optimum number of iterations that an error between a known temperature and an obtained temperature is minimum.

According to the present invention, there is provided another apparatus for measuring a temperature distribution along an optical fiber, comprising light source means for projecting pulsed-light into the optical fiber; means for sensing Fresnel reflected light from an end of the optical fiber; means for performing a deconvolution a plurality of times on the Fresnel reflected light, the number of times performing the deconvolution being determined such that a result of the deconvolution shows an impulse response waveform; optical filter means for receiving Raman spectrum of backscattered light from the optical fiber and extracting anti-Stokes component and Stokes component of the Raman spectrum in the backscattered light; means for performing a deconvolution a plurality of times on the anti-Stokes component and the Stokes component to obtain an impulse response of the anti-Stokes component and an impulse response of the Stokes component, the number of times the deconvolution is to be performed on the Stokes and anti-Stokes components corresponding to the number of times the deconvolution is performed on the Fresnel reflected light; and means for obtaining a temperature distribution according to a ratio between the impulse responses of the anti-Stokes component and the Stokes component.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 shows the basic configuration for implementing the principle of the temperature distribution measuring apparatus according to the present invention;

FIG. 4 shows a temperature distribution waveform obtained by the configuration of FIG. 3;

FIGS. 5A, 5B, and 5C show the effects of deconvolution of the temperature distribution waveform shown in FIG. 4;

FIG. 6 shows the relationship between the number of iterations for obtaining an inverse matrix of incident light used in deconvolution and error;

FIGS. 7A, 7B, and 7C show the effects of deconvolution when the reference temperature portion is made longer than the half-width of the incident pulsed-light;

FIGS. 8A, 8B, and 8C show the effects of deconvolution when the reference temperature portion is made shorter than the half-width of the incident pulsed-light;

FIG. 10 shows the principle of a temperature distribution measuring apparatus according to a second embodiment of the present invention; and FIG. 11 is a block diagram of the overall configuration of a temperature distribution measuring apparatus of the second embodiment.

DETAILED DESCRIPTION OF THE PREFERRED EMBODIMENTS

A preferred embodiment of a temperature distribution measuring apparatus according to the present invention will now be described with reference to the accompanying drawings.

Before going into explanation of a temperature distribution sensing apparatus according to the present invention, the principle of measuring temperature distribution will be described.

If in an optical fiber for temperature measurement, the backscattering coefficient per unit length is $S(z)$, an attenuation factor that the incident light pulse suffers while traveling in the optical fiber is $R_f(z)$, an attenuation factor that the backscattered light suffers in the optical fiber until it reaches the incident end is $R_b(z)$, and a group velocity of pulsed-light in the optical fiber is $Vg$, the impulse response (power) $h(t)$ of the backscattered light obtained by projecting pulsed-light into the optical fiber (and is included in Equation (1)) is expressed by the following expression:

$$h(t) = R_f(z) S(z) R_b(z) Vg/2 \qquad (4)$$

As shown in Equation (1), the backscattered light $g(t)$ is obtained by performing convolution on the impulse response with respect to the incident light P(t). To be more specific, what are convoluted with the incident light P(t) in the scattering process are coefficients Sa(z) of the anti-Stokes component and Ss(z) of the Stokes component of the Raman spectrum of the backscattered light. After the backscattered lights of the anti-Stokes component and the Stokes component of the Raman spectrum are inversely transformed (subjected to deconvolution) to obtain the impulse responses of the anti-Stokes component and the Stokes component of the Raman spectrum of the backscattered light, the temperature distribution is calculated based on the ratio between these two impulse responses in order to compensate for the attenuation effect of the optical fiber.

To obtain the impulse response, in the actual apparatus, after the backscattered light is converted into an electric signal with a photodiode or the like, the resulting signal undergoes A/D conversion and the converted signal is treated as the sampled-value system digital signal. Thus, the convolution given by integral Equation (1) is expressed as follows:

$$g(i) = \sum_{j=1}^{n} Pijhj \qquad (5)$$

Figure 1:
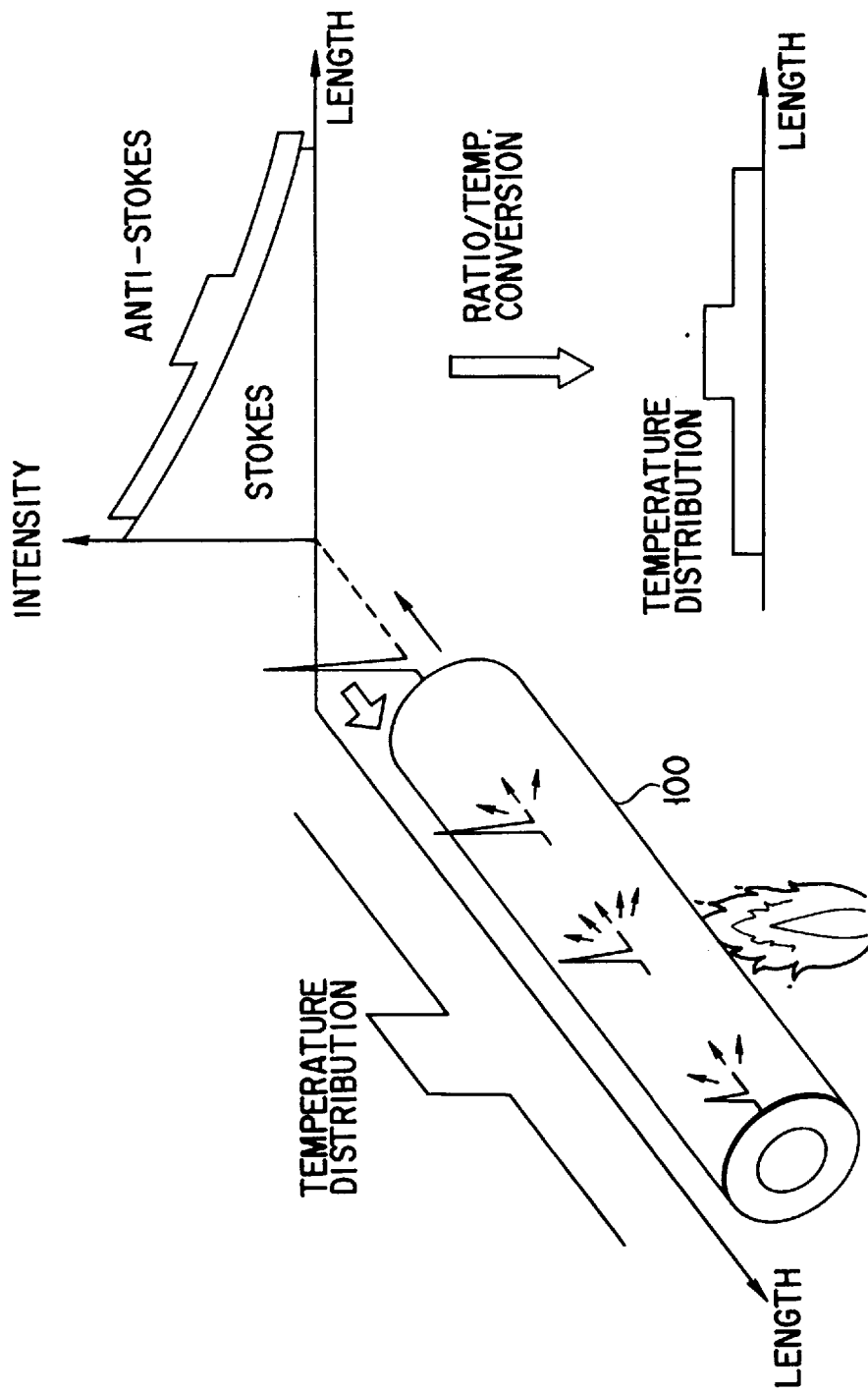
FIG. 1 is a schematic diagram of a conventional temperature distribution measuring apparatus based on the OTDR technique.
Figure 2C:
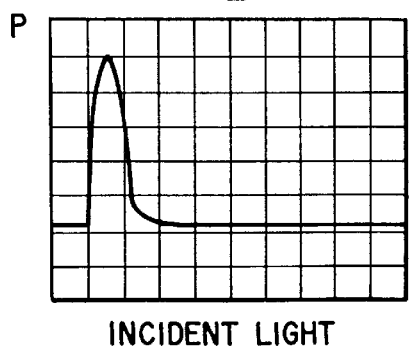
FIG. 2 shows the principle of the temperature distribution measuring apparatus according to the present invention.

Equation (5) can be illustrated by an n×n matrix that has only diagonal components where the position of the incident pulse moves as time elapses, as shown in FIG. 2. In equation (5), n corresponds to the number of positions along the optical fiber. In this case, the elements in each row of the incident light Pij are the measured values of the pulsed-light waveform in the order of measurement.

Thus, to obtain the impulse response hj, it is necessary to multiply both sides of Equation (5) by the inverse matrix of the incident light Pij. Multiplication by the inverse matrix of the incident light Pij corresponds to deconvolution. For obtaining the impulse response while monitoring the influence of noise, a method of converging the solution (the inverse matrix) using an iteration method (for example, Jacobi method or Gauss-Seidel method) is suitable.

In an iteration method, if the number of iterations is "k" and the i-th solution (the final solution of the present invention is to obtain the impulse response) in the k-th iteration is $hi^{(k)}$, the i-th solution $hi^{(k+1)}$ in the (k+1)th iteration is expressed as:

$$hi^{(k+1)} = hi^{(k)} + \frac{d}{Pii}\left(gi - \sum_{j=1}^{i-1} Pijhj^{(k+1)} - \sum_{j=1}^{n} Pijhj^{(k)}\right).$$

where d is a constant.

The number of iterations of an iteration method for obtaining the impulse response hi will be explained. As shown in FIG. 3, a signal processing device 101, an 80° C. thermostat chamber 102, and a 1-Km optical fiber 103 are prepared. Specified portions of 2 m, 5 m, 10 m, 20 m, and 50 m long respectively, of the optical fiber 103 are put in the thermostatic chamber 102 to keep them at 80° C. With the specified portions kept at this temperature, the signal processing device 101 (also having the function of projecting a laser pulse) measures the anti-Stokes component and the Stokes component of the Raman spectrum of the backscattered light by OTDR technique. Then, computing the ratio between the anti-Stokes component and the Stokes component along the optical fiber gives a waveform shown in FIG. 4.

In this case, all the computation results for the specified portions placed in the thermostatic chamber 102 should be the same. Actually, however, as apparent from FIG. 4, a sufficient amplitude cannot be obtained for the portions shorter than 10 m of the optical fiber 103, that is, the 5-m and 2-m-long portions, due to convolution, because the half-width of the light pulse used in the measurement is 200 nsec and corresponds to 10 m of the optical fiber. The half-width of the light pulse is the half-period of the light pulse, i.e., the reciprocal of the frequency. The product of the half-width or half-period with the speed of light, c ($3\times10^8$ m/sec) produces the half-wavelength of the light pulse. The refractive index of the optical fiber is based on the wavelength of the incident light pulse. The velocity of the incident light pulse is reduced from the speed of light by the refractive index, i.e., c divided by the refractive index. Thus, based on the half-width of the light pulse, the distance the half-width light pulse travels can be determined by multiplying the half-width by c and dividing the product by the refractive index. Therefore, the half-width of the light pulse, although measured in time, corresponds to the length traveled in the optical fiber.

To eliminate such an effect of convolution, the impulse response was obtained by performing deconvolution of the measured data of the backscattered light acquired through the above measurement, with respect to the incident light.

When the waveform of the measured data before deconvolution was as shown in FIG. 5A, performing deconvolution of this data using the inverse matrix of the incident light obtained by an iteration method with five iteration times gave a waveform shown in FIG. 5B; performing deconvolution of this data using the inverse matrix obtained by an iteration method with ten iteration times gave a waveform shown in FIG. 5C.

As seen from FIGS. 5A, 5B, and 5C, deconvolution can improve not only an insufficient amplitude of the measured data, but also the rising/falling characteristic.

Although such improvements can be achieved, it is found that as the number of iterations of an iteration method for obtaining the inverse matrix increases, the effect of noise becomes more significant.

Here, errors such as the amplitude that do not reach a specified value due to the effect of convolution (as shown in FIG. 4, errors appear in that portion of which length is less than half the width of the pulse of the incident light) are defined as system errors, and variations due to the influence of noise are defined as random errors. To examine the relationship between the number of iterations for obtaining the inverse matrix of the incident light by an iteration method, the system error, and the random error, deconvolution was performed on the 5-m-long heated portion, using the data on the portion immediately before the heated portion as the random error. This deconvolution produced the results for the total error shown in FIG. 6.

As obvious from FIG. 6, as the number of iterations is increased, random errors increase at a constant rate. System errors, however, first continue to decrease at a constant rate until a certain number of iterations is reached, and thereafter increase at a constant rate.

Thus, there is an optimum number of iterations that minimizes the total error obtained by adding the system error and the random error. Specifically, when the temperature distribution is exactly known as in the case of the optical fiber 103 placed in the thermostatic chamber 102 of FIG. 3, the difference between the measured value and the known temperature is computed for each iteration. By finding the smallest of the results, the optimum number of iterations can be obtained. Contrary to the present invention, a conventional iteration method finds out a suitable iteration number based on the degree of convergence of the solution. In a conventional iteration method, an iteration is ended if the difference between a current solution and a previous solution becomes less than a predetermined level. However, the solution thus obtained cannot ensure that the total error is minimum. According to the present invention, however, it is possible to obtain the optimum solution having the minimum error.

In such a deconvolution method, however, as the number of iterations for obtaining the inverse matrix increases, random noise increases. Thus, where there are few system errors, for example, where the temperature distribution is almost uniform, only random errors increase. Therefore, it is when the temperature distribution is measured where the temperature changes significantly with respect to space, especially where the temperature is locally very high and low that this deconvolution method is effective.

Therefore, a plant control system to which such a deconvolution method is applied is a system where an abnormality in the system appears as a local temperature rise. In such a system, when the temperature rises locally, applying the optimum number of iterations enables the efficient sensing of the temperature rise.

With the present invention, to find the optimum number of iterations of an iteration method for obtaining an inverse matrix of the incident light which is deconvoluted with the measured value of the backscattered light, at least a portion of an optical fiber shorter than half the width of the incident light pulse is heated or cooled to use this heated or cooled portion as a reference temperature portion, and the number of iterations that the total accuracy of the reference temperature portion is best improved is determined. In an actual measurement, deconvolution is performed to obtain an impulse response using an inverse matrix of the incident light which is calculated by an iteration method with an optimum number of iterations. This makes it possible to improve the positional resolution remarkably while minimizing the effect of noise in measuring the temperature distribution by means of an optical fiber.

In this case, when the reference temperature portion (FIG. 7A) is longer than half the width of the incident light pulse (FIG. 7B), the measured value (FIG. 7C) has a sufficient amplitude to obtain the correct temperature. Therefore, the effect of deconvolution is not great. With the present invention, however, the reference temperature portion (FIG. 8A) is made shorter than half the width of the incident light pulse (FIG. 8B), so that the measured value (FIG. 8C) has an insufficient amplitude. Therefore, the effect of deconvolution is great. An amplitude of the measured value is increased by means of deconvolution.

Figure 9:
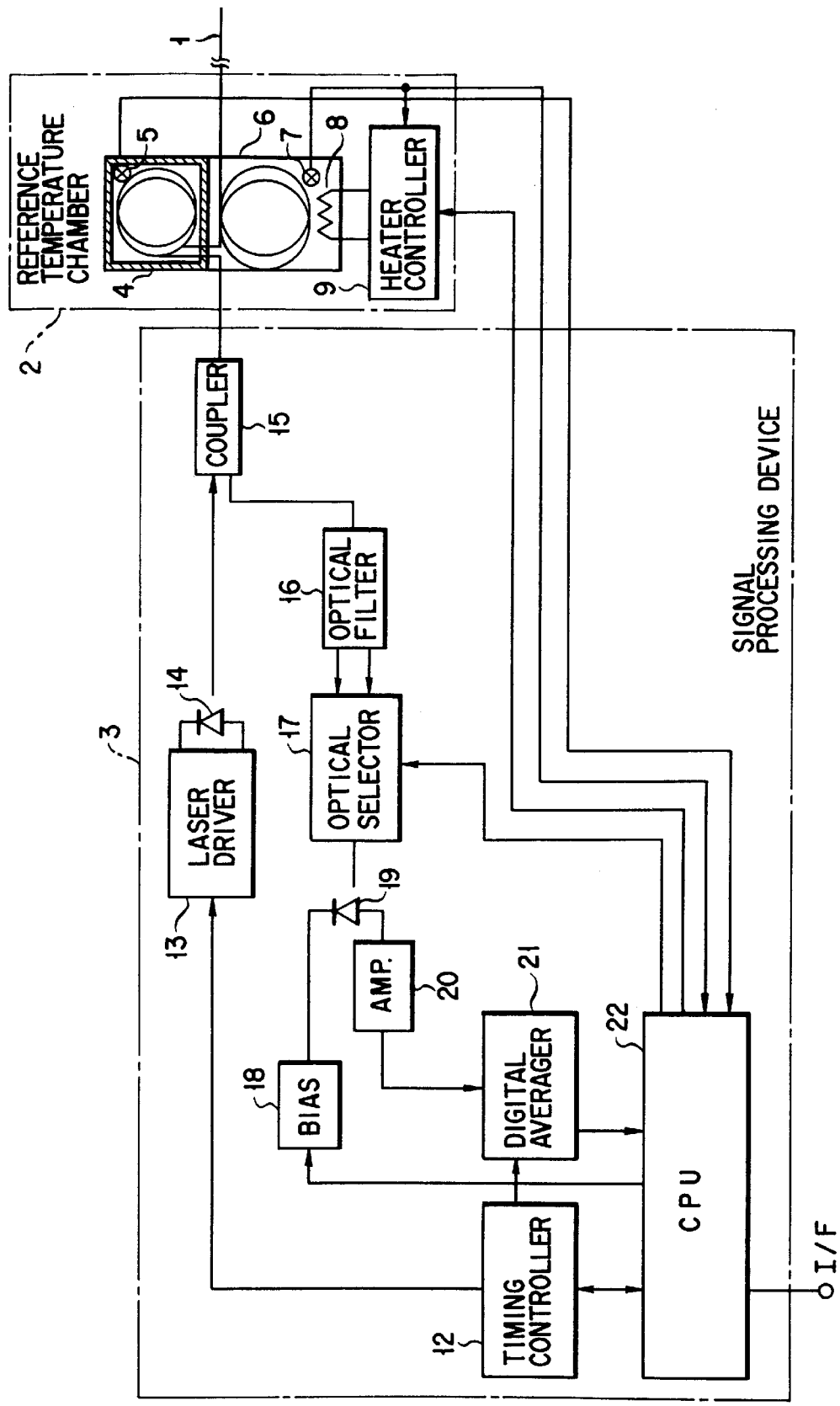
FIG. 9 is a block diagram of the overall configuration of a temperature distribution measuring apparatus according to a first embodiment of the present invention.

FIG. 9 is a schematic diagram of a temperature distribution measuring apparatus according to a first embodiment of the present invention based on such principles.

The first embodiment comprises an optical fiber 1, a signal processing device 3 which projects light pulse into the optical fiber 1, senses the backscattered light from the optical fiber 1, and measures the temperature distribution along the optical fiber 1 on the basis of the ratio of the anti-Stokes component to the Stokes component of the Raman spectrum of the backscattered light, and a reference temperature chamber 2 in which one end of the optical fiber 1 on the side of the signal processing device 3 is placed.

At the time of initialization and at regular intervals during the actual measurement, a portion of the optical fiber 1 is heated to a high temperature by the reference temperature chamber 2 with another portion kept at room temperature. In this state, the signal processing device 3 produces very narrow light pulse and projects it into the optical fiber 1. Thereafter, it takes in the backscattered light, obtains the impulse response on the basis of the anti-Stokes component and the Stokes component of the Raman spectrum of the backscattered light by an iteration method for obtaining the inverse matrix used in deconvolution, and finds the optimum number of iterations that the total error becomes the smallest.

For an actual measurement, the signal processing device 3 generates incident light pulses having a very narrow pulse width and projects it into the optical fiber 1. It then takes in the backscattered light, obtains the impulse responses of the anti-Stokes component and the Stokes component of the Raman spectrum of the backscattered light by an iteration method with the optimum number of iterations, and measures the temperature distribution at each point where the optical fiber is laid, on the basis of a ratio of these impulse responses.

The optical fiber 1 is laid so as to pass through each portion where the temperature is to be measured. A portion of the optical fiber 1 is heated to a high temperature by the reference temperature chamber 2, while another portion of the optical fiber is kept at room temperature. When light pulse arrives at its incident end, the optical fiber 1 takes it in and returns the backscattered light to the incident end according to the temperature at each portion.

The reference temperature chamber 2 comprises a room temperature enclosure 4 in which a portion of the optical fiber 1 is housed, a temperature sensor 5 which is placed in the room temperature enclosure 4 and which measures the temperature in the room temperature enclosure 4 and supplies the measurement result to the signal processing device 3, a rectangular high-temperature enclosure 6 which is placed so as to be adjacent to the room temperature enclosure 4 and which houses another portion of the optical fiber 1 shorter than the half-width of the light pulse output from the signal processing device 3, a temperature sensor 7 which is placed in the high-temperature enclosure 6 and which measures the temperature in the high-temperature enclosure 6 and supplies the measurement result to the signal processing device 3, a heater 8 placed in the high-temperature enclosure 6, and a heater controller 9 which, when the signal processing device 3 is issuing a high-temperature instruction, actuates the heater 8 on the basis of the measurement result from the temperature sensor 7 to heat the temperature in the high-temperature enclosure 6 to a predetermined temperature. While in FIG. 9, the optical fiber 1 is looped in the enclosures 4 and 6 to make them compact, it is not necessarily looped. The optical fiber 1 may be straight in the enclosures 4 and 6.

The temperature sensor 5 measures the temperature in the room temperature enclosure 4 and supplies the measurement result to the signal processing device 3. The temperature sensor 7 measures the temperature in the high-temperature enclosure 6 and supplies the measurement result to the signal processing device 3 and the heater controller 9. When the signal processing device 3 is issuing a high-temperature instruction, the heater controller 9 actuates the heater 8 on the basis of the measurement result from the temperature sensor 7 to raise the temperature in the high-temperature enclosure 6 to the predetermined high temperature, thereby bringing a portion of the optical fiber 1 housed in the high-temperature enclosure 6 into a high-temperature state.

The signal processing device 3 comprises a timing controller 12, a laser driver 13, a laser light source 14, a coupler 15, an optical filter 16, an optical selector 17, a bias controller 18, a photodiode 19, a photocurrent amplifier circuit 20, a digital averager 21, and a CPU 22.

The pulsed-laser light from the laser light source 14, such as a semiconductor laser, is directed to enter an incident end of the optical fiber 1 via the coupler 15. The laser light source 14 is actuated by the laser driver 13 controlled by the timing controller 12. The timing controller 12 is controlled by the CPU 22.

The backscattered light emitted from the optical fiber 1 goes through the coupler 15 and is separated by the optical filter 16 into the Stokes component and the anti-Stokes component of the Raman spectrum of the backscattered light. One of the two components is selected by the optical selector 17 and is allowed to enter the photodiode 19. The photodiode 19 is controlled by the bias controller 18. The output current of the photodiode 19 is supplied to the digital averager 21 via the photocurrent amplifier 20. The digital averager 21 averages the measurement results of backscattered light to many incidences of pulse-light. Since the backscattered light has a very small amplitude, the measured value is obtained based on the average value of many measurements. The output of the averager 21 is supplied to the CPU 22. The CPU 22 is connected to a temperature distribution output interface (not shown).

At the time of initialization and at regular intervals during the actual measurement, the signal processing device 3 causes the reference temperature chamber 2 to raise a portion of the optical fiber 1 placed in the high-temperature enclosure 6 to a high temperature, while keeping another portion of the optical fiber 1 placed in the room-temperature enclosure 4 at room temperature. In this state, the signal processing device 3 produces very narrow pulsed-light and projects it into the optical fiber 1. It then takes in the backscattered light and obtains the impulse responses of the anti-Stokes component and the Stokes component of the Raman spectrum of the backscattered light by an iteration method. It should be noted that the backscattered light is measured on the basis of the averaged value of many incidents of pulsed-light. While computing the temperature distribution from the ratio between these two impulse responses, it finds the optimum number of iterations for obtaining the inverse matrix used in deconvolution that the total error becomes the smallest.

For an actual measurement, the signal processing device 3 generates incident pulsed-light having a very narrow pulse light and projects it into the optical fiber 1. It then takes in its backscattered light, obtains the impulse responses of the anti-Stokes component and the Stokes component of the Raman spectrum of the backscattered light by an iteration method with the optimum number of iterations, and measures the temperature distribution at each point where the optical fiber is laid, on the basis of the ratio between these two impulse responses.

The timing controller 12 together with the CPU 22 produces a light-emission timing signal, a synchronous addition timing signal, etc. It supplies the light-emission timing signal to the laser driver 13 to control the latter. It also supplies the synchronous addition timing signal to the digital averager 21 to control the latter.

The laser driver 13 produces a very narrow driving pulse according to the light-emission timing signal from the timing controller 12, and supplies the driving pulse to the laser light source 14 to cause the latter to emit pulsed-light.

The laser light source 14 produces pulsed-light of a predetermined wavelength as long as the laser driver 13 is outputting the driving pulse, and supplies the light pulse to the coupler 15.

The coupler 15 directs the pulsed-light from the laser light source 14 to the incident end of the optical fiber 1 or the backscattered light emitted from the incident end to the optical filter 16. It takes in the pulsed-light from the laser light source 14 and directs this to the incident end of the optical fiber 1. It then takes in the backscattered light which occurred as the pulsed-light was traveling in the optical fiber 1 and which is emitted from the incident end, and directs it to the optical filter 16.

The optical filter 16 takes in the backscattered light emitted from the coupler 15 and separates the backscattered light into the anti-Stokes component and the Stokes component of the Raman spectrum through wave-length discrimination. It then directs, to the optical selector 17, the anti-Stokes component and the Stokes component of the Raman spectrum of the backscattered light thus obtained.

The optical selector 17 selects one of the anti-Stokes component and the Stokes component of the Raman spectrum of the backscattered light supplied from the optical filter 16 on the basis of the select signal from the CPU 22. It then directs to the photodiode 19 either the anti-Stokes component or the Stokes component of the Raman spectrum of the backscattered light thus obtained.

The bias controller 18 generates a bias voltage on the basis of the bias instruction signal from the CPU 22, and supplies the bias voltage thus produced to the photodiode 19.

The photodiode 19, biased with the bias voltage from the bias controller 18, generates photocurrent according to the intensity of the anti-Stokes component or the Stokes component of the Raman spectrum of the backscattered light emitted from the optical selector 17. It then supplies the photocurrent generated to the photocurrent amplifier 20.

The photocurrent amplifier 20 produces a backscattered signal by amplifying the photocurrent from the photodiode 19. It then supplies the backscattered signal thus obtained to the digital averager 21.

The digital averager 21 takes in the backscattered signal from the photocurrent amplifier 20 on the basis of the synchronous addition timing signal from the timing controller 12. It then performs synchronous addition of the backscattered signals to generate the average output of the anti-Stokes component or the Stokes component of the Raman spectrum of the backscattered light and supplies it to the CPU 22.

The CPU 22 controls the entire temperature distribution sensing apparatus. The CPU 22 performs various processes, including the process of controlling the timing controller 12 and the bias controller 18 to adjust the light-emission timing and the synchronous addition timing, the process of taking in the average output of the anti-Stokes component or the Stokes component of the Raman spectrum of the backscattered light and storing it, the process of finding the optimum number of iterations for obtaining the inverse matrix used in deconvolution to obtain the impulse response at the time of initialization or at predetermined intervals during an actual measurement, the process of obtaining the impulse response of the anti-Stokes component and the Stokes component of the Raman spectrum of the backscattered light by performing the above-described deconvolution on each stored average output in which the inverse matrix is obtained by an iteration method with the optimum number of iterations when the measurement instruction is issued and producing a temperature signal from the ratio of these signals, and the process of out-putting the temperature signal obtained by the preceding process to the related circuit via the temperature distribution output interface.

The operation of determining the optimum number of iterations for obtaining the inverse matrix which is used in deconvolution to obtain the impulse response and the temperature measuring operation in the first embodiment shown in FIG. 9 will now be described.

First, at the time of circuit initialization after the power of the temperature distribution sensing apparatus is turned on, or each time the predetermined correction timing is reached during an actual measurement, the CPU 22 of the signal processing device 3 takes in not only the sensed data from the temperature sensor 5 to sense the temperature in the room temperature enclosure 4 but also the sensed data from the temperature sensor 7 to verify whether or not the temperature in the high-temperature enclosure 6 is at the predetermined temperature.

If the high-temperature enclosure 6 is not at the predetermined value, the CPU 22 controls the heater controller 9 to raise the temperature in the high-temperature enclosure 6 to the predetermined temperature.

When the temperature in the high-temperature enclosure 6 has reached the predetermined temperature, the CPU 22 controls the optical selector 17 to select the anti-Stokes component of the Raman spectrum of the backscattered light and then causes the timing controller 12 to drive the laser driver 13. This causes the laser light source 14 connected to the laser driver 13 to produce incident light pulse having a pulse width very narrow pulse width. The pulsed-light is supplied to the coupler 15.

The coupler 15 directs the pulsed-light to the optical fiber 1. The backscattered light undergoes wavelength discrimination with the optical filter 16, and is separated into the anti-Stokes component and the Stokes component of the Raman spectrum of the backscattered light.

Because the optical selector 17 is switched to the anti-Stokes component side, the anti-Stokes component obtained from the wavelength discrimination process at the optical filter 16 is directed to the photodiode 19 which converts it into photocurrent, and is amplified by the photocurrent amplifier 20 into the anti-Stokes component signal. After this, the digital averager 21 performs synchronous addition on the anti-Stokes component signals a predetermined number of times to produce the average output of the anti-Stokes component signals. The average output is supplied to the CPU 22, which stores it.

After this process is completed, the CPU 22 causes the optical selector 17 to select the Stokes component of the Raman spectrum of the backscattered signal and then causes the timing controller 12 to drive the laser driver 13. This causes the laser light source 14 connected to the laser driver 13 to produce incident light pulse having a very narrow pulse width. This pulsed-light is supplied to the coupler 15.

The coupler 15 directs the pulsed-light to the optical fiber 1. The backscattered light undergoes wavelength discrimination with the optical filter 16 and is separated into the anti-Stokes component and the Stokes component of the Raman spectrum of the backscattered light.

The optical selector 17 selects the Stokes component of the Raman spectrum of the backscattered light obtained from the wavelength discrimination process at the optical filter 16. The selected backscattered light is directed to the photodiode 19 which converts it into photocurrent, and is amplified by the photocurrent amplifier 20 into the Stokes component signal. After this, the digital averager 21 performs synchronous addition on the Stokes component signals the predetermined number of times to produce the average output of the Stokes component signals. The average output is supplied to the CPU 22, which stores it.

After the averaging process of the anti-Stokes component signal and the Stokes component signal is finished, the CPU 22 performs deconvolution on the stored average outputs of the anti-Stokes component and the Stokes component to obtain the respective impulse responses. It then generates a temperature signal from the ratio between these responses, and computes the total error of the temperature of the portions housed in the reference temperature chamber 2.

In this case, because the high-temperature portion placed in the high-temperature enclosure 4 of the reference temperature chamber 2 is shorter than the half-width of light pulse, it has not reached a particular temperature expected from the heating temperature at first. By repeating deconvolution (multiplication of the inverse matrix obtained by an iteration method, i.e., by repeating the calculation of the inverse matrix), the high-temperature portion approaches the proper value gradually. In this process, the random error is evaluated on the basis of the temperature data on a sufficiently longer portion of the optical fiber 1 than half the width of the light-pulse housed in the room temperature enclosure 6 of the reference temperature chamber 2.

The number of iterations for calculating the inverse matrix that the total error is not less than that in the preceding calculation is determined to be the optimum number of iterations by the CPU 22, which then stores the optimum number.

After the operation of determining the above optimum number of iterations is completed, the CPU 22 causes the optical selector 17 to select the anti-Stokes component of the Raman spectrum of the backscattered light and then causes the timing controller 12 to drive the laser driver 13. This causes the laser light source 14 connected to the laser driver 13 to produce incident light pulse having a very narrow pulse width. This light pulse is supplied to the coupler 15.

The coupler 15 then directs the pulse-light to the optical fiber 1. The backscattered light undergoes wavelength discrimination with the optical filter 16 and is separated into the anti-Stokes component and the Stokes component of the Raman spectrum of the backscattered light.

The optical selector 17 selects the anti-Stokes component obtained from the wavelength discrimination process at the optical filter 16. The selected light is directed to the photodiode 19 which converts it into photocurrent, and is amplified by the photocurrent amplifier 20 into the anti-Stokes component signal. After this, the digital averager 21 performs synchronous addition on the anti-Stokes component signals the predetermined number of times to produce the average output of the anti-Stokes component signals. The average output is supplied to the CPU 22, which stores it.

After this process is complete, the CPU 22 causes the optical selector 17 to select the Stokes component of the Raman spectrum of the backscattered signal and then causes the timing controller 12 to drive the laser driver 13. This causes the laser light source 14 connected to the laser driver 13 to produce incident light pulse having a very narrow pulse width. This light pulse is supplied to the coupler 15.

The coupler 15 then directs the pulsed-light to the optical fiber 1. The backscattered light undergoes wavelength discrimination with the optical filter 16 and is separated into the anti-Stokes component and the Stokes component of the Raman spectrum of the backscattered light.

Then, the optical selector 17 selects the Stokes component of the Raman spectrum of the backscattered light obtained from the wavelength discrimination process at the optical filter 16 is directed to the photodiode 19, which converts it into photocurrent. The photocurrent is amplified by the photocurrent amplifier 20 into the Stokes component signal. After this, the digital averager 21 performs synchronous addition on the Stokes component signals the predetermined number of times to produce the average output of the Stokes component signals. The average output is supplied to the CPU 22, which stores it.

After this process is complete, the CPU 22 performs deconvolution on the stored average outputs of the anti-Stokes component signal and the Stokes component signal to obtain the respective impulse responses. Deconvolution is performed by multiplication of the inverse matrix of the incident light. The inverse matrix is calculated by an iteration method with the optimum number of iterations. Therefore, the impulse responses thus obtained have a minimum error. Finally, the CPU 22 obtains a temperature signal from the ratio between these impulse responses and outputs the signal to the related circuit via the temperature distribution output interface.

As described above, in the first embodiment, at the time of initialization and at regular intervals during an actual measurement, a portion of the optical fiber 1 is heated to a high temperature by the reference temperature chamber 2 with another portion kept at room temperature. In this state, the signal processing device 3 produces very narrow pulsed-light and projects it into the optical fiber 1. Thereafter, it takes in the backscattered light (an averaged value), performs deconvolution on the anti-Stokes component and the Stokes component of the Raman spectrum of the backscattered light using the inverse matrix of the incident light calculated by an iteration method to find the optimum number of iterations. To perform temperature measurement, the signal processing device 3 generates very narrow light pulse and projects it into the optical fiber 1. It then takes in its backscattered light, performs deconvolution on the anti-Stokes component and the Stokes component of the Raman spectrum of the backscattered light using the inverse matrix calculated by an iteration method with the optimum number of iterations to obtain the impulse responses of the anti-Stokes component and the Stokes component of the Raman spectrum of the backscattered light. This prevents the solution (the impulse response) from diverging under the influence of noise in deconvolution. As a result, it is possible to achieve the optimum approximation that improves the total accuracy most without narrowing the width of the light pulse. In addition, the positional resolution can be improved without a decrease in the signal-to-noise ratio due to a narrower width of the pulsed-light, a consequent increase in the measuring time, or an increase in the complexity of the semiconductor laser driver. This improvement facilitates the sensing of abnormally heated portions such as hot spots.

In the first embodiment, to obtain the optimum number of iterations, at least a portion of the optical fiber shorter than half the width of the incident light pulse is heated or cooled and the heated or cooled portion is defined as a reference temperature portion. The number of iterations that the total accuracy of the reference temperature portion is most improved is determined. A second embodiment related to another method of finding the optimum number of iterations will be described.

In the second embodiment, instead of checking errors to find the optimum number of iterations that the error becomes the smallest, Fresnel reflected light from the incident end or terminal end of the optical fiber is taken in as shown in FIG. 10, and deconvolution is performed using the inverse matrix calculated by an iteration method. The optimum number of iterations is so determined that the waveform of the Fresnel reflected light after deconvolution becomes a streak like an impulse response. The actual measuring operation in the second embodiment is the same as that in the first embodiment.

FIG. 11 shows the construction of the second embodiment. The same parts as those in the first embodiment are indicated by the same reference numerals and their detailed explanation will be omitted.

The second embodiment is obtained by eliminating the reference temperature chamber 2 from the first embodiment. The arrangement of the signal processing device 3 is the same as that of the first embodiment. Specifically, in the second embodiment, which comprises the optical fiber 1 and the signal processing device 3, at the time of initialization and at regular intervals during an actual measurement, the signal processing device 3 generates very narrow pulsed-light and projects it into the optical fiber 1. It then takes in the Fresnel reflected light, performs deconvolution on the Fresnel reflected light using the inverse matrix calculated by an iteration method to determine the optimum number of iterations. For an actual measurement, the signal processing device 3 generates very narrow pulsed-light and projects it into the optical fiber 1. It then takes in its backscattered light, performs deconvolution on the anti-Stokes component and the Stokes component of the Raman spectrum of the backscattered light using the inverse matrix calculated by an iteration method with the optimum number of iterations to measure the temperature distribution at each point where the optical fiber 1 is laid.

The optical fiber 1 is laid so as to pass through each portion where the temperature is to be measured. It, when pulsed-light has arrived at its incident end, takes the pulsed light in and returns the backscattered light according to each portion and the Fresnel reflected light at the terminal end (the end on the opposite side of the incident end) to the incident end.

The signal processing device 3 comprises a timing controller 12, a laser driver 13, a laser light source 14, a coupler 15, an optical filter 16, an optical selector 17, a bias controller 18, a photodiode 19, an optical current amplifier 20, a digital averager 21, and a CPU 22. It, at the time of initialization and at regular intervals, generates very narrow pulsed-light and projects it into the optical fiber 1, takes in the Fresnel reflected light from the terminal end of the optical fiber 1 and performs deconvolution on the Fresnel reflected light using the inverse matrix calculated by an iteration method to obtain the optimum number of iterations that the waveform of the signal corresponding to the Fresnel reflected light takes the form of an impulse response. Because the Fresnel reflected light from the terminal end returns later than the backscattered light and its amplitude is much greater than that of the backscattered light, it can be distinguished from the backscattered light. For an actual measurement, as with the first embodiment, the signal processing device 3 generates incident pulsed-light having a very narrow pulse width and projects it into the optical fiber 1. It then takes in its backscattered light, performs deconvolution on the anti-Stokes component and the Stokes component of the Raman spectrum of the backscattered light using the inverse matrix calculated by an iteration method with the optimum number of iterations to measure the temperature distribution at each point where the optical fiber 1 is laid.

The photodiode 19, which is an avalanche diode made of, for example, silicon, converts the anti-Stokes component or the Stokes component of the Raman spectrum of the backscattered light from the optical selector 17 into photocurrent at a high amplification factor when the bias voltage from the bias controller 18 is high, and supplies the photocurrent to the photocurrent amplifier 20. When the bias voltage from the bias controller 18 is low, it converts the anti-Stokes component or the Stokes component of the Raman spectrum of the backscattered light from the optical selector 17 into photocurrent at a low amplification factor (for example, an amplification factor of 1), and supplies the photocurrent to the photocurrent amplifier 20. The reason for this is to cope with the difference in amplitude between the Raman spectrum of the backscattered light and the Fresnel reflected light.

The operation of the second embodiment will be explained. When the circuitry is initialized after the power of this apparatus is turned on or each time a predetermined correction timing is reached, the CPU 22 of the signal processing device 3 causes the bias controller 18 to produce a low voltage to make the amplification factor of the photodiode 19 low (for example, an amplification factor of 1). After this, the CPU 22 causes the timing controller 12 to drive the laser driver 13. This causes the laser light source 14 connected to the laser driver 13 to generate incident light pulses having a very narrow pulsed-light. This pulse width is supplied to the coupler 15.

The coupler 15 directs the pulsed-light to the optical fiber 1. The Fresnel reflected light is emitted from the terminal end of the optical fiber 1, and the reflected light is directed via the optical filter 16 and the optical selector 17 to the photodiode 19, which converts it into photocurrent. After the photocurrent amplifier 20 amplifies the photocurrent into a Fresnel reflected light signal, the digital averager 21 performs synchronous addition a predetermined number of times to produce the average output of Fresnel reflected light signals. The average output is supplied to the CPU 22.

After this process is finished, the CPU 22 performs deconvolution on the stored average output of the Fresnel reflected light signal using the inverse matrix calculated by an iteration method and determines a number of iterations such that the waveform of the Fresnel reflected light coincides with the desired linear waveform such as an impulse response previously stored, to be the optimum number of iterations. It then stores the optimum number.

After the operation of determining the optimum number of iterations is completed, the CPU 22 causes the optical selector 17 to select the anti-Stokes component signal and then causes the timing controller 12 to drive the laser driver 13. This causes the laser light source 14 connected to the laser driver 13 to produce incident light pulse having a very narrow pulse width. This pulsed-light is supplied to the coupler 15.

The coupler 15 then directs the pulsed-light to the optical fiber 1. The backscattered light undergoes wavelength discrimination at the optical filter 16 and is separated into the anti-Stokes component and the Stokes component of the Raman spectrum of the backscattered light.

The optical selector 17 selects the anti-Stokes component obtained from the wavelength discrimination process at the optical filter 16. The selected light is directed to the photodiode 19, which converts it into photocurrent. The photocurrent is amplified by the photocurrent amplifier 20 into the anti-Stokes component signal. After this, the digital averager 21 performs synchronous addition on the anti-Stokes component signals the predetermined number of times to produce the average output of the anti-Stokes component signals. The average output is supplied to the CPU 22, which stores it.

After this process is complete, the CPU 22 causes the optical selector 17 to select the Stokes component signal and then causes the timing controller 12 to drive the laser driver 13. This causes the laser light source 14 connected to the laser driver 13 to produce incident light pulses having a very narrow pulsed-light. This pulse width is supplied to the coupler 15.

The coupler 15 then directs the pulsed-light to the optical fiber 1. The backscattered light undergoes wavelength discrimination at the optical filter 16 and is separated into the anti-Stokes component and the Stokes component of the Raman spectrum of the backscattered light.

The optical selector 17 selects the Stokes component of the Raman spectrum of the backscattered light obtained from the wavelength discrimination process at the optical filter 16. The selected light is directed to the photodiode 19 which converts it into photocurrent. The photocurrent is amplified by the photocurrent amplifier 20 into the Stokes component signal. After this, the digital averager 21 performs synchronous addition on the Stokes component signals the predetermined number of times to produce the average output of the Stokes component signals. The average output is supplied to the CPU 22 and stored.

After this process is complete, the CPU 22 performs deconvolution on the stored average output of the anti-Stokes component signal and that of Stokes component signal by using the inverse matrix calculated by an iteration method with the optimum number of iterations, to obtain the respective impulse responses. Finally, it obtains the temperature signal from the ratio between these impulse responses and outputs the signal to the related circuit via the temperature distribution output interface.

As described above, with the second embodiment, at the time of initialization and at regular intervals during an actual measurement, the signal processing device 3 generates incident light pulses having a very narrow pulse width and projects it into the optical fiber 1, takes in the Fresnel reflected light from the terminal end of the optical fiber 1, and performs deconvolution on this Fresnel reflected light using the inverse matrix calculated by an iteration method to obtain the optimum number of iterations that the waveform of the signal corresponding to the Fresnel reflected light after deconvolution takes the form of an impulse response. For an actual measurement, the signal processing device 3 generates incident light pulses having a very narrow pulse width and projects it into the optical fiber 1. It then takes in its backscattered light, performs deconvolution on the anti-Stokes component and the Stokes component of the Raman spectrum of the backscattered light using the inverse matrix calculated by an iteration method with the optimum number of iterations to measure the temperature distribution at each point where the optical fiber 1 is laid. This prevents the solution, i.e., the impulse response, from diverging under the influence of noise in an iteration process. As a result, it is possible to achieve the optimum approximation that improves the total accuracy most without narrowing the width of the pulsed-light. In addition, the positional resolution can be improved without a decrease in the signal-to-noise ratio due to a narrower pulsed-light width, a consequent increase in the measuring time, or an increase in the complexity of the semiconductor laser driver. This improvement facilitates the sensing of abnormally heated portions such as hot spots.

In the second embodiment, to cope with the difference in amplitude between the Fresnel reflected light and the Raman spectrum of the backscattered light, the value of the bias voltage applied to the photodiode 19 is switched so as to make the amplification factor smaller. When the intensity of the Fresnel reflected light is made almost equal to the intensity of the anti-Stokes component or the Stokes component of the Raman spectrum of the backscattered light by applying an attenuation coating to the incident and terminal ends of the optical fiber 1, the Fresnel reflected light can be converted into photocurrent without the change of the bias voltage to the photodiode 19 and the saturation of the photodiode 19, thereby providing a similar effect to that of the above-described embodiments. Further, though in the above description, the intensity of the intensity of the Fresnel reflected light is decreased by controlling the bias voltage applied to the photodiode 19, it is not necessary to control the bias voltage applied to the photodiode 19 if the Fresnel reflected light is sensed by the optical filter 16 as shown in FIG. 11. It is to be noted that it is possible to use either one of the Stokes component and the anti-Stokes component of the Fresnel reflected light. The light leaked out from the optical filter 16 is decreased with reference to the incident light to the filter 16. The filter 16 works as an attenuation means in the second embodiment. On the contrary, if the bias voltage applied to the photodiode 19 is controlled as described above, it is not necessary to provide the optical filter 16.

As described above, according to the temperature distribution measuring apparatus of the present invention which improves the positional resolution in the temperature distribution by obtaining the impulse response by performing deconvolution on the backscattered light using the inverse matrix of the incident light which is calculated by an iteration method, it is possible to prevent the solution of an iteration method, i.e., the inverse matrix, from diverging under the influence of noise. As a result, it is possible to achieve the optimum approximation that improves the total accuracy most without narrowing the width of the light pulse. In addition, the positional resolution can be improved without a decrease in the signal-to-noise ratio due to a narrower light pulse width, a consequent increase in the measuring time, or an increase in the complexity of the semiconductor laser driver. This improvement facilitates the sensing of abnormally heated portions such as hot spots.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, a successive over-relaxation method, a symmetric successive over-relaxation method, or the Chebyshev semi-iterative method may be used as an iteration method for obtaining an inverse matrix of the incident light.

What is claimed is:

1. An apparatus for measuring a temperature distribution along an optical fiber comprising:

light source means for projecting a light pulse into the optical fiber;

optical filter means for receiving a Raman spectrum of backscattered light from the optical fiber and extracting an anti-Stokes component and a Stokes component of the Raman spectrum in the backscattered light;

means for performing a deconvolution a number of times on the Stokes component and the anti-Stokes component using an inverse matrix of the projected light pulse to obtain an impulse response of the anti-Stokes component and an impulse response of the Stokes component, the inverse matrix being obtained by an iteration method with an optimum number of iterations;

means for obtaining a temperature distribution according to a ratio between the impulse responses of the anti-Stokes and the Stokes components;

control means for causing said temperature distribution obtaining means to obtain a temperature distribution which includes an obtained temperature in a portion of the optical fiber as long as or shorter than a half of a pulse width of the light pulse, the portion having a known temperature, and for determining the obtained temperature by performing a deconvolution a number of times such that an error between the known temperature, and the obtained temperature is minimum; and wherein the number of times that the deconvolution is performed by the performing means is equal to the number of times the deconvolution is performed by the control means.

2. An apparatus according to claim 1, wherein said impulse response is obtained using the following equation:

$$hi^{(k+1)} = hi^{(k)} + \frac{d}{Pii}\left(gi - \sum_{j=1}^{i-1} Pij hj^{(k+1)} - \sum_{j=1}^{n} Pij hj^{(k)}\right)$$

where $hi^{(k+1)}$ is an i-th solution for a (k+1)th iteration, $hi^{(k)}$ is an i-th solution for a k-th iteration, d is a constant, and Pij is the inverse matrix of the light pulse projected into the optical fiber.

3. An apparatus according to claim 1, wherein the control means determines the number of times the deconvolution is to be performed when power to the apparatus is turned on or each time a predetermined period of time elapses in operation.

4. A method of measuring a temperature distribution along an optical fiber, comprising the steps of:

heating a portion of the optical fiber to a predetermined temperature, the portion having a predetermined length;

projecting a first light pulse into the optical fiber, the first light pulse having a pulse width, one half of which is longer than the predetermined length of said portion;

receiving a first Raman spectrum in a first backscattered light from the optical fiber in response to said first light pulse and extracting a first anti-Stokes component and a first Stokes component of the first Raman spectrum in the first backscattered light;

performing a deconvolution a number of times on the first Stokes component and the first anti-Stokes component using an inverse matrix of the projected first light pulse to obtain a first temperature signal based on a result of the deconvolution, the number of times of performing the deconvolution being determined such that an error between the first temperature signal and the predetermined temperature is minimized;

projecting a second light pulse into the optical fiber, with said optical fiber placed in an area where a temperature distribution is to be measured;

receiving a second Raman spectrum in a second backscattered light from the optical fiber in response to said second light pulse and extracting a second anti-Stokes component and a second Stokes component of the second Raman spectrum in the second backscattered light; and performing a deconvolution a number of times on the second Stokes component and the second anti-Stokes component using an inverse matrix of the projected second light pulse to obtain a second temperature signal based on a result of the deconvolution on the second Stokes and anti-Stokes components, the number of times of performing the deconvolution on the second Stokes and anti-Stokes components being equal to the number of times of performing the deconvolution on the first Stokes and anti-Stokes components, the second temperature signal corresponding to the temperature distribution along the optical fiber.

* * * * *

UNITED STATES PATENT AND TRADEMARK OFFICE
CERTIFICATE OF CORRECTION

PATENT NO. : 5,825,804
DATED : October 20, 1998
INVENTOR(S) : Yukio SAI.

It is certified that error appears in the above-indentified patent and that said Letters Patent is hereby corrected as shown below:

Claim 1, Column 18, line 2, after "temperature", delete ",".

Signed and Sealed this

Sixth Day of July, 1999

Attest:

Q. TODD DICKINSON

Attesting Officer     Acting Commissioner of Patents and Trademarks